(12) United States Patent
Jeong et al.

(10) Patent No.: US 7,953,465 B2
(45) Date of Patent: May 31, 2011

(54) MOBILE COMMUNICATION TERMINAL

(75) Inventors: Chul Ho Jeong, Seoul (KR); Kyung Taek Lim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 844 days.

(21) Appl. No.: 11/871,763

(22) Filed: Oct. 12, 2007

(65) Prior Publication Data

US 2008/0090627 A1   Apr. 17, 2008

(30) Foreign Application Priority Data

Oct. 12, 2006   (KR) .................. 10-2006-0099139
Oct. 12, 2006   (KR) .................. 10-2006-0099140

(51) Int. Cl.
*H04M 1/00*   (2006.01)
(52) U.S. Cl. ................ 455/575.4; 379/433.12
(58) Field of Classification Search .......... None
See application file for complete search history.

(56) References Cited

U.S. PATENT DOCUMENTS
2005/0078817 A1 *   4/2005   Lee .................. 379/433.12

FOREIGN PATENT DOCUMENTS
KR   10-2006-0043065 A   5/2006

* cited by examiner

*Primary Examiner* — Phuoc Doan
(74) *Attorney, Agent, or Firm* — Birch, Stewart, Kolasch & Birch, LLP (57) ABSTRACT

A mobile communication terminal is provided. The mobile communication terminal includes a first body, a second body slidably moveable between a first position and a second position, a plate located between the first body and the second body, the plate being connected to one of the first body and the second body, a slider supported by the plate to be slidably moveable thereon, the slider being connected to the other of the first body and the second body. An elastic supporter may be located on at least one of the plate and a first surface of the slider. A buffering part may be located on the slider. Alternatively, the buffering part may be located on one of the first body and the second body.

19 Claims, 14 Drawing Sheets

MOBILE COMMUNICATION TERMINAL

CROSS REFERENCE TO RELATED APPLICATIONS

This application claims priority to Korean Application No. 10-2006-0099139, filed Oct. 12, 2006, and Korean Application No. 10-2006-0099140, filed Oct. 12, 2006, and both of which are herein incorporated by reference.

BACKGROUND OF THE INVENTION

1. Field of the Invention

The present invention relates to a mobile communication terminal, and more particularly, to an apparatus for sliding and mobile communication terminal having the same.

2. Description of Related Art

Generally, a mobile communication terminal is carried by a user and enables the user to exchange various kinds of information including video, audio, text, and the like with a corresponding user via wireless communication or enables the user to be provided with various services by accessing a prescribed server. The mobile communication terminal may be a mobile phone, a PDA (personal digital assistant), or the like. Furthermore, the mobile communication terminal, and more particularly, the mobile phone has evolved from an bar types into flip types, a folder types, and a slide types.

Figure 1:
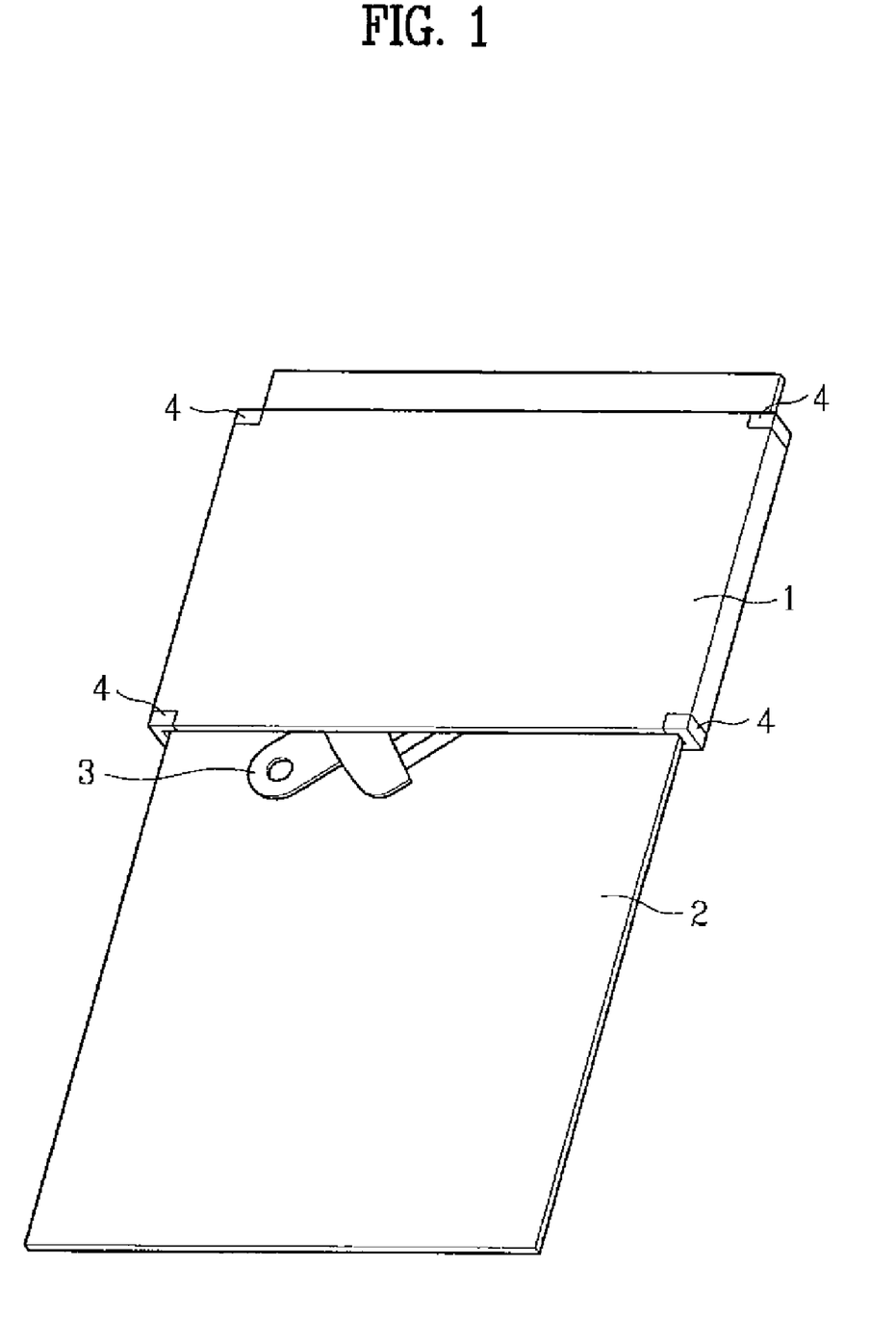
FIG. 1 is a perspective view of a sliding apparatus used for a slide type mobile communication terminal according to a related art.

As shown in FIG. 1, a sliding apparatus for providing sliding movement for a mobile phone according to the related art consists of a moving part 1, a fixing plate 2 provided between a body of a terminal (not shown) and the moving part 1, which is moveable thereon. The sliding apparatus further includes an elastic device 3 provided between the fixing plate 2 and the moving part 1 to assist the moving part 1 to slide on the fixing plate 2.

To prevent free movement between the moving part 1 and the fixing plate 2 in the above-configured sliding apparatus, a loose-fitting adjusting part 4 is provided.

Figure 2:
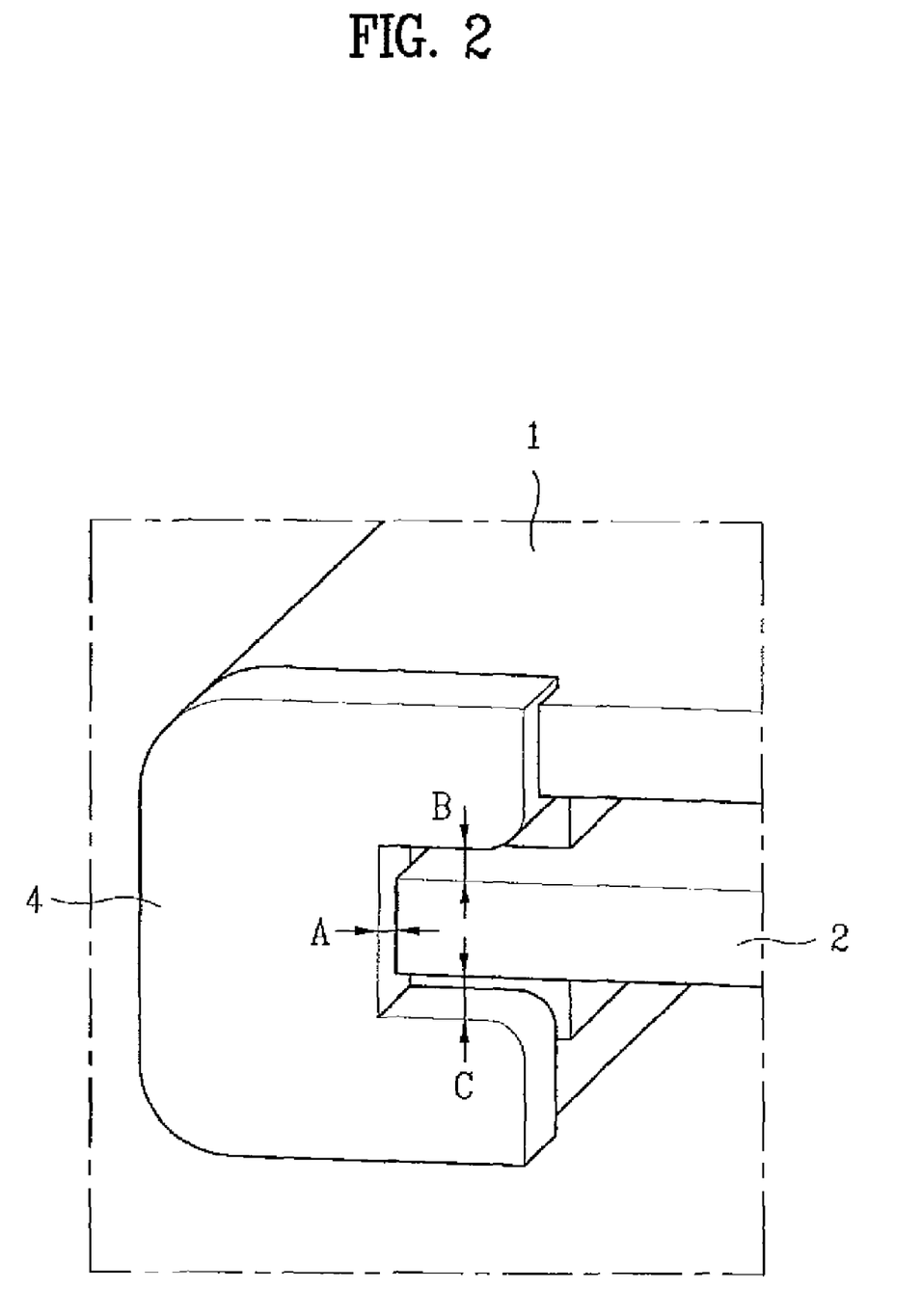
FIG. 2 is an enlarged view of an upper end portion of the sliding apparatus of FIG. 1.

As shown in FIG. 2, the loose-fitting adjusting part 4 is provided at a lateral end portion of the moving part 1 that is configured to enclose a lateral end portion of the fixing plate 2. The loose-fitting adjusting part 4 adjusts a gap B or C between the fixing plate 2 and the moving part 1 in a thickness direction of the fixing plate 2 and also adjusts a gap A in a horizontal direction of the fixing plate 2. Thus, the moving part 1 is prevented from moving freely against the fixing plate 2. In particular, free movement is restricted by adjusting the amount of pressure the moving part 1 applies against the fixing plate 2 via the loose-fitting adjusting part 4.

However, in the related art sliding apparatus, friction can be excessively applied to interrupt a sliding motion of the apparatus for sliding. As a result, the moving part fails to move smoothly on the fixing plate causing the sliding motion of the moving part to feel unnatural. If the gap is excessively reduced, the sliding motion may become impossible. Even if the sliding motion is possible, considerable frictional noise can be generated between the moving part and the fixing plate.

Furthermore, each mobile phone has a different environment, different design parameters, different conditions for use, and each part of the mobile phone has its own conditions, as well. Therefore, controlling the gaps of the loose-fitting adjusting part 4 is heavily dependent on each individual mobile phone, which is very inconvenient and time-consuming. Moreover, it may cause product reliability issues.

BRIEF SUMMARY OF THE INVENTION

Accordingly, the present invention is directed to a mobile communication terminal that obviates one or more problems due to limitations and disadvantages of the related art.

According to principles of this invention, a mobile communication terminal having a first body, a second body slidably moveable between a first position and a second position, a plate located between the first body and the second body, the plate being connected to one of the first body and the second body, a slider supported by the plate to be slidably moveable thereon, the slider being connected to the other of the first body and the second body, and an elastic supporter provided on at least one of the plate aid a first surface of the slider, the elastic supporter biasing the plate away from the first surface of the slider to resist movement between the plate and the slider, is provided.

In another aspect, the elastic supporter may include at least one elastic member provided at least one of an upper portion of the slider and a lower portion of the slider. The at least one elastic member may have a supporting portion configured to extend from the slider, and a free-end portion pressed against the plate.

In a further aspect, the at least one elastic member may include at least one upper elastic member provided at the upper portion of the slider, the at least one upper elastic member being configured to have the free-end portion extend away from the upper portion of the slider, and at least one lower elastic member provided at the lower portion of the slider, the at least one lower elastic member being configured to have the free-end portion extend away from the lower portion of the slider.

In another aspect, the elastic supporter may include at least one elastic protrusion provided at least one of an upper portion of the plate and a lower portion of the plate. The at least one elastic protrusion may have a supporting portion configured to extend from the plate, and a free-end portion pressed against the slider.

In a further aspect, the at least one elastic protrusion may include at least one upper elastic protrusion provided at the upper portion of the plate, the at least one upper elastic protrusion being configured to have the free-end portion extend towards an outer edge of the upper portion of the plate, and at least one lower elastic protrusion provided at the lower portion of the plate, the at least one lower elastic protrusion being configured to have the free-end portion extend towards an outer edge of the lower portion of the plate.

In still another aspect, the elastic supporter may include at least one elastic member provided at least one of an upper portion of the slider and a lower portion of the slider, and at least one elastic protrusion provided at least one of an upper portion of the plate and a lower portion of the plate.

According to principles of the present invention, a mobile communication terminal having a first body, a second body slidably moveable between a first position and a second position, a plate located between the first body and the second body, the plate being connected to one of the first body and the second body, a slider supported by the plate to be slidably moveable thereon, the slider being connected to the other of the first body and the second body, and a buffering part located on the slider and configured to engage one of the first body and second body when in at least one of the first position and the second position, is provided.

In another aspect, the terminal may include a seating portion located at one of the first body and the second body, and the buffering part is receivable by the seating portion.

In a further aspect, the seating portion may include a seating recess and the buffering part may include a buffering protrusion configured to have a shape corresponding to the seating recess. As an alternative, the seating portion may include a seating protrusion configured to protrude and the buffering part may include a buffering recess configured to have a shape corresponding to the seating protrusion.

In a different aspect, the buffering part may include a first buffering part located at an upper portion of the slider, and a second buffering part located at a lower portion of the slider. The seating portion may include a first seating portion located at an upper portion of one of the first body and the second body, and a second seating portion located at a lower portion of one of the first body and the second body. The first buffering part is received in the first seating part and the second buffering part is received in the second seating part.

In still another aspect, the terminal may include an elastic supporter provided on at least one of the plate and a first surface of the slider, the elastic supporter biasing the plate away from the first surface of the slider to resist movement between the plate and the slider.

Further aspects of the elastic supporter are similar to those described above.

In yet another aspect, the terminal may include an installation recess at one of the first body and the second body to have the plate and the slider installed therein, a holding member protruding from at least one side of the installation recess, and a projection at least one side of the slider to be held by the holding member when the slider is in at least one of the first and second positions. The holding member may include a protruding holder protruding from the at least one side of the installation recess. The holding member may also include a spring holder at the at least one side of the installation recess to contact the projection of the slider.

According to principles of the present invention, a mobile communication terminal having a first body, a second body slidably moveable between a first position and a second position, a plate located between the first body and the second body, the plate being connected to one of the first body and the second body, a slider supported by the plate to be slidably moveable thereon, the slider being connected to the other of the first body and the second body, and a buffering part located on one of the first body and the second body, the buffering part engaging the slider when the slider is in one of the first position and the second position.

Further aspects of the terminal are similar to those described above.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 and FIG. 10 are schematic views showing operational status when the sliding apparatus of FIG. 4 and FIG. 5 is applied to a mobile communication terminal;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
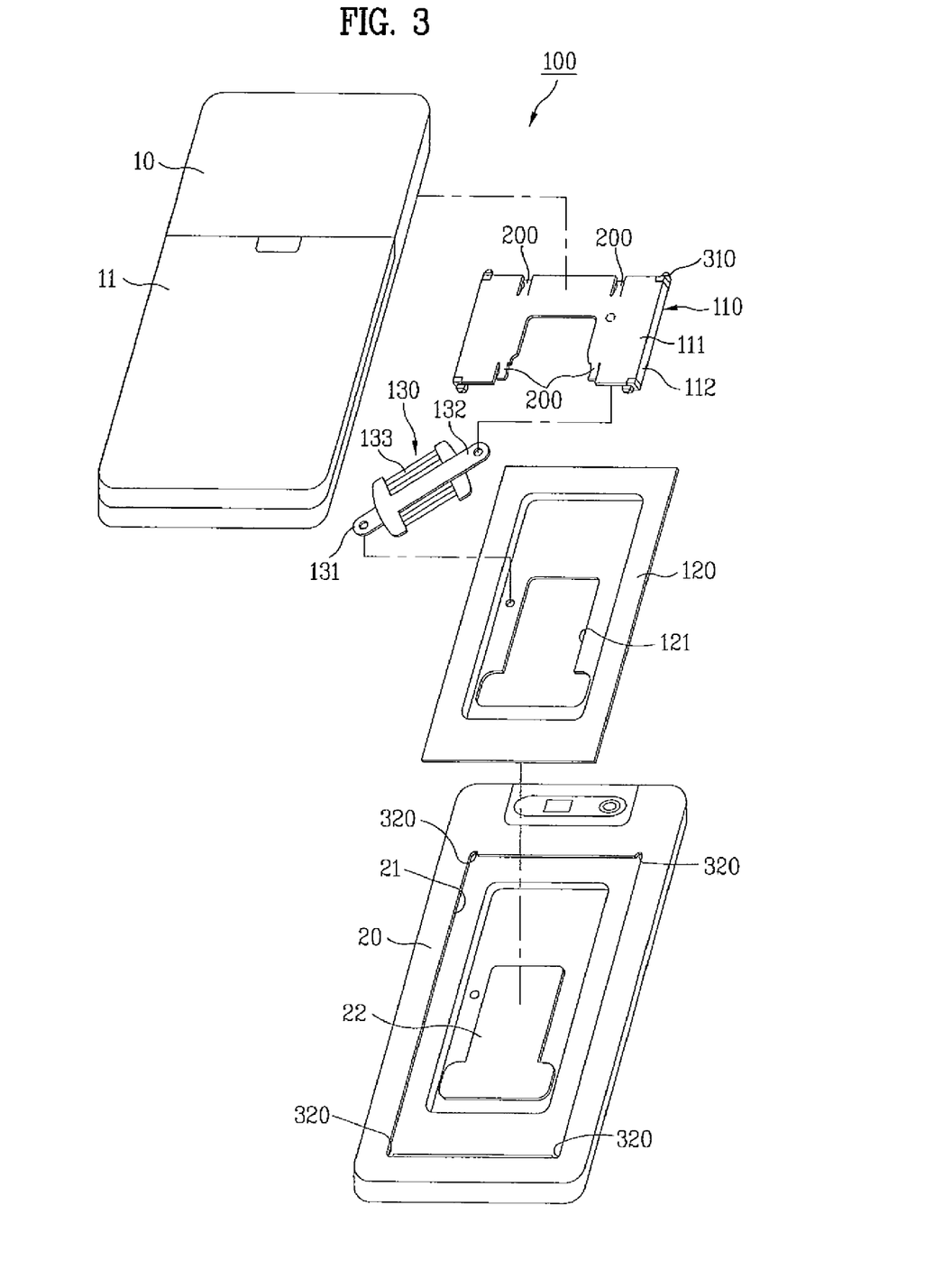
FIG. 3 is a schematic exploded perspective view of a mobile communication terminal provided with a sliding apparatus according to an exemplary embodiment of the present invention.

As shown in FIG. 3, a mobile communication terminal according to the present invention includes a first body 10 having internal component parts loaded therein, a second body 20 configured to be slidably moveable with respect to the first body 10 includes internal component parts loaded therein, and a sliding apparatus 100 located at an installation recess 21 formed on a backside of the second body 20 to enable a sliding motion of the second body 20 on the first body 10. The first body may include a battery 11.

The sliding apparatus 100 includes a plate 120 installed in the installation recess 21, a slider 110 slidingly mounted on the plate 120, and an elastic module 130 provided between the plate 120 and the slider 110 to assist the slider 110 to be slidably moveable in an automatic or semi-automatic fashion. While the plate 120 is shown as installed on the second body 20, the plate 120 may be installed on the first body 10. In addition, the plate 120 may include a hole 121 that allows a flexible circuitry supporting substrate (not shown) to connect one or more components in the first body 10 with one or more components in the second body.

The elastic module 130 includes a first link 131, a second link 132, and an elastic member 133 connecting the first and second links 131 and 132 together. In this particular configuration, the first and second links 131 overlap each other.

In this exemplary embodiment, the slider 110 includes a body part 111 connected to the first body 10 and a sliding part 112 provided at both side portions of the body part 111 to enclose the side portions of the plate 120. The sliding part 112 slidably moves on the plate 120 and is supported by both of the side portions of the plate 120.

In the present invention, a stabilizer for preventing free movement and shock of the sliding apparatus is provided. An example of the stabilizer, as shown in FIG. 3, includes an elastic supporter 200, a buffering part 310, and a seating part 320. The elastic supporter 200 may be provided at both upper and lower portions of the slider 110. The seating part 320 may be provided at both upper and lower portions of the installation recess 21. The buffering part 310 may be provided at both upper and lower portions of the sliding part 112 of the slider 110. Details of the elastic supporter 200, the buffering part 310, and the seating part 320 will be explained in detail below.

An exemplary sliding apparatus, as shown in FIGS. 4 to 7, includes the plate 120, the slider 110, and the elastic module 130. In particular, at least one elastic supporter 200 is provided at at least one of the slider 110 and the plate 120.

Figure 4:
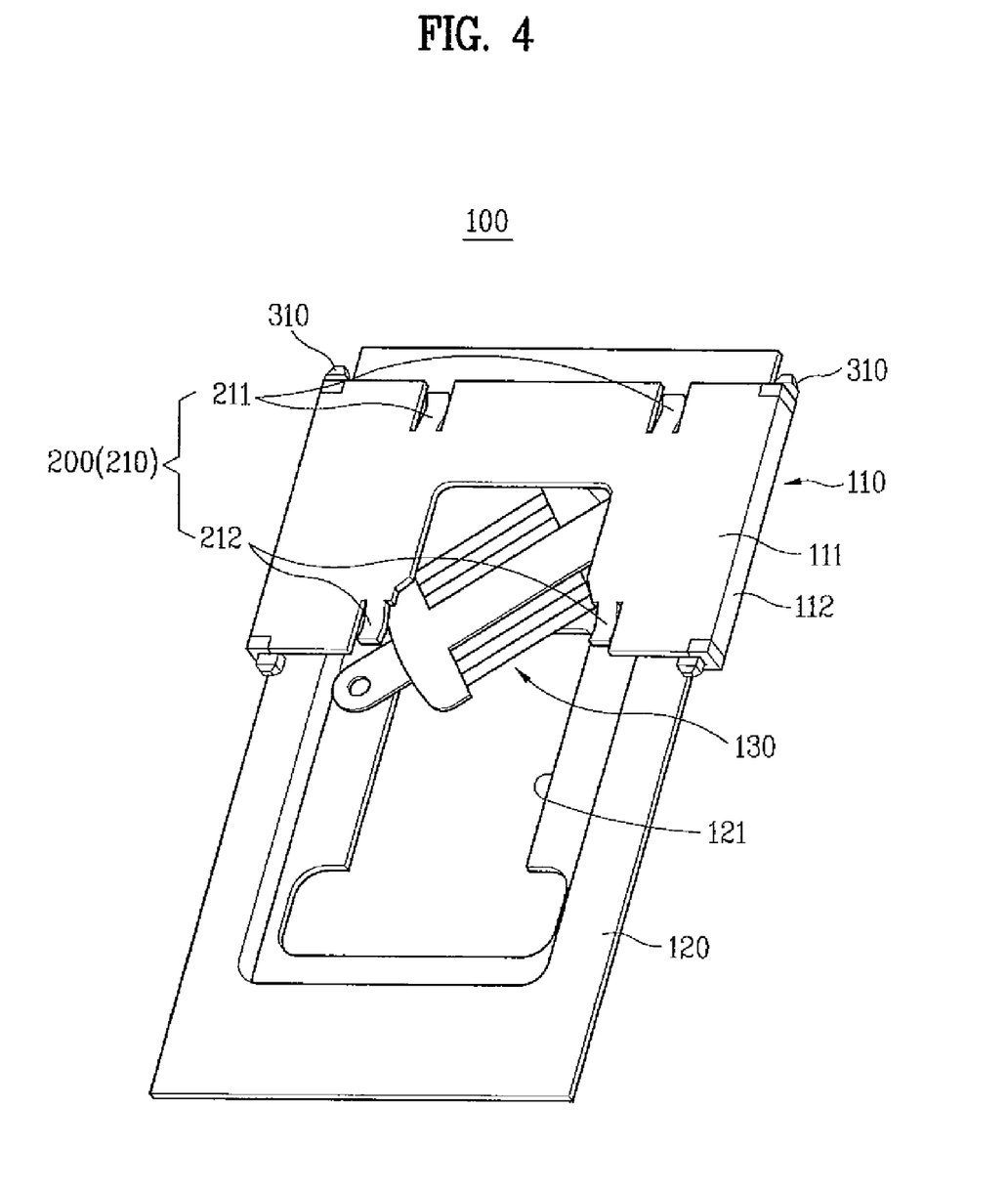
FIG. 4 and FIG. 5 are perspective views showing an operation of an a sliding apparatus according to one exemplary embodiment of the present invention.
Figure 5:
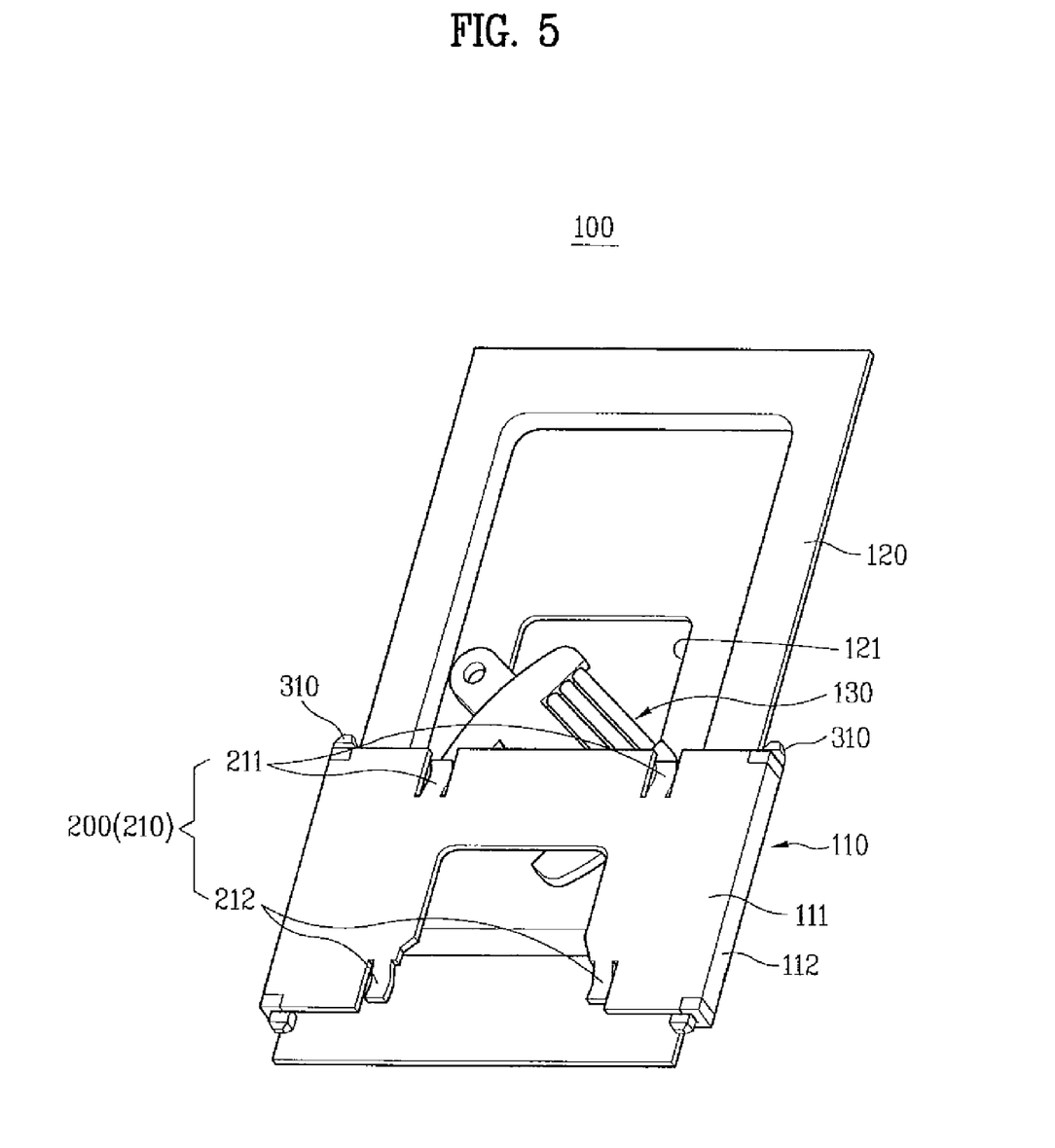

As shown in FIG. 4 and FIG. 5, the elastic supporter 200 may be formed of individual elastic support parts 210 provided at both upper and lower portions of the slider 110. The elastic support part 210 includes a supporting portion 210a formed in body part 111 to have elasticity and a free end portion 210b elastically contacting with the plate 120 to transfer a supporting power of the supporting portion 210a to the plate 120. In this particular configuration, the upper portion of the slider includes upper elastic support part 211 and the lower portion of the slider includes lower elastic support parts 212

At least one upper elastic support part 211 of the elastic support part 210 is provided at an upper portion of the slider 110 and the free end portion 210b is configured to extend away from the upper portion of the slider 110. At least one lower elastic support part 212 of the elastic support part 210 is provided at a lower portion of the slider 110 and the free end portion 210b is configured to extend away from the slider 210. This configuration is preferable in that the upper and lower elastic support parts 211 and 212 are configured not to interrupt a sliding motion of the slider 110 when the slider 110 moves along the plate 120.

Figure 6:
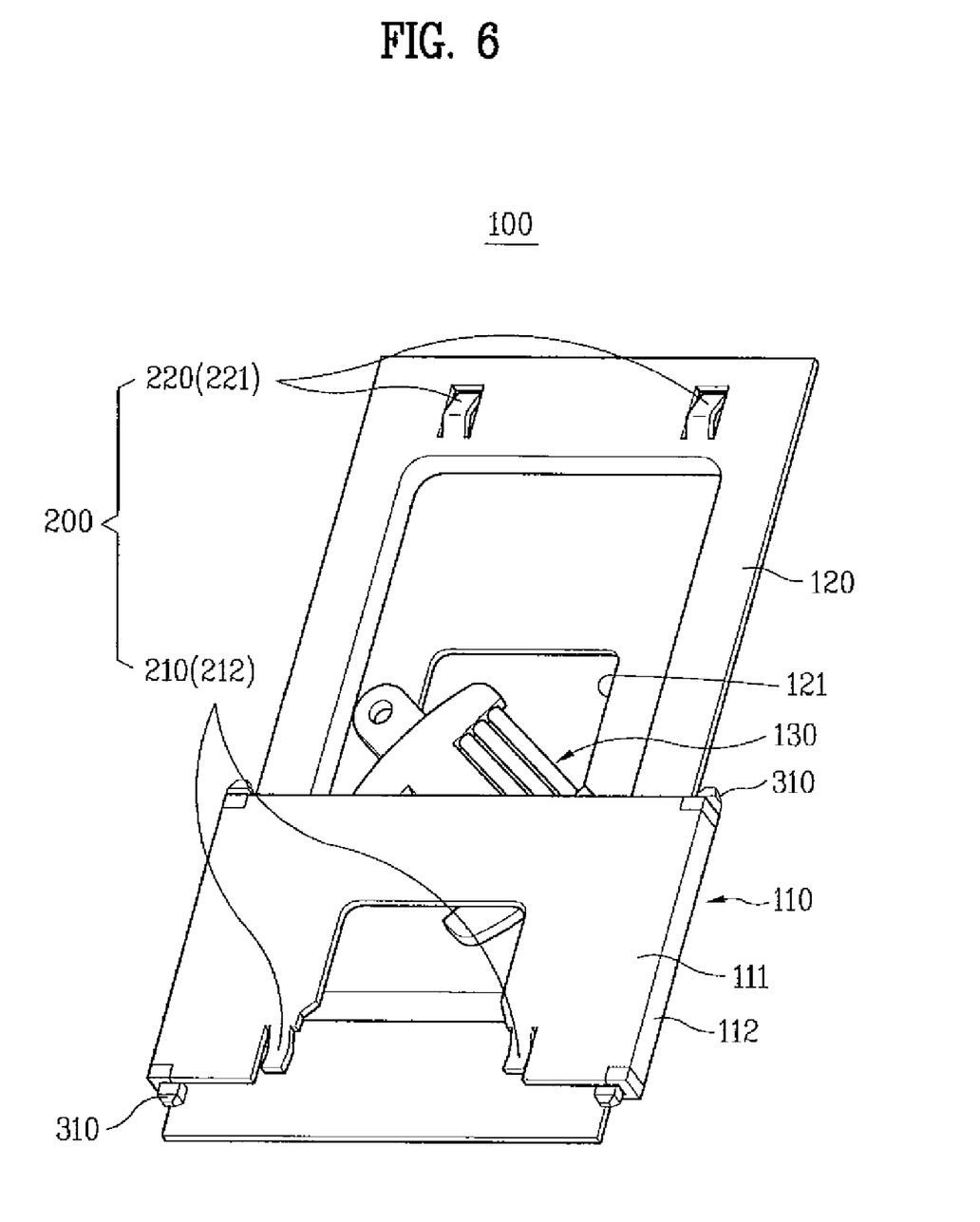
FIG. 6 and FIG. 7 are perspective views of sliding apparatuses according to other exemplary embodiments of the present invention.
Figure 7:
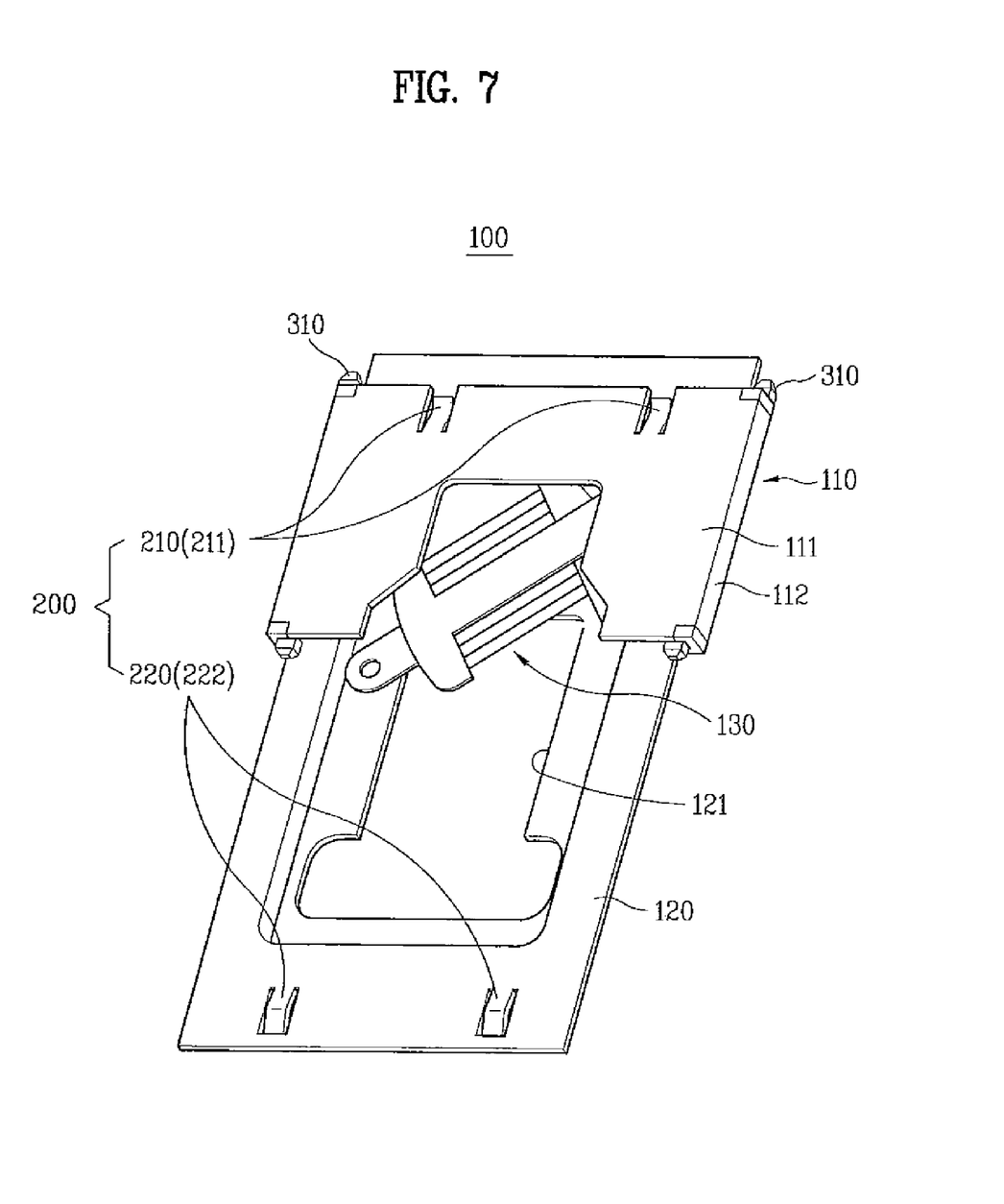

In the embodiment shown in FIG. 6 and FIG. 7, elastic supporter 200 can include an elastic support part 210 provided at a slider 110 and an elastic protrusion 220 provided at a plate 120. The elastic protrusion may be an upper elastic protrusion 221 provided at an upper portion of the plate 120 (FIG. 6) or a lower elastic protrusion 222 provided at a lower portion of the plate 120 (FIG. 7).

In FIG. 6, the upper elastic protrusion 221 of the elastic protrusion 220 is provided at an upper portion of the plate 120 and a lower elastic support part 212 of the elastic support part 210 is provided at a lower portion of the slider 110.

Like the elastic support part 210, the elastic protrusion 220 includes a support portion 220a and a free end portion 220b. And, the free end portion 220b of the upper projection 221 is configured to extend towards an outer edge of the upper portion of the plate 120.

In the embodiment shown in FIG. 7, an upper elastic support part 211 of an elastic support part 210 is provided at an upper portion of the slider 110 and a lower elastic protrusion 222 of the elastic protrusion 220 is provided to a lower portion of the plate 120. In this configuration, a free end portion 220b of the lower protrusion 222 is configured to extend towards an outer edge of the lower portion of the plate 120.

While the elastic protrusion 220 has been shown with an elastic support part 210, it is understood that an elastic protrusion 220 can be provided without an elastic support part 210.

The elastic support part 210 and the elastic protrusion 220 elastically support the slider to resist free movement of the slider 110 with respect to the plate 120, thereby enhancing reliability in a sliding action of a mobile communication terminal.

Sometimes during the course of the slider moving from a first position to a second position, the slider may provide a shock force to the installation recess of the first or second body. To counter this shock force, the present invention also provides means for preventing or reducing the free movement or shock from the slider.

Figure 8:
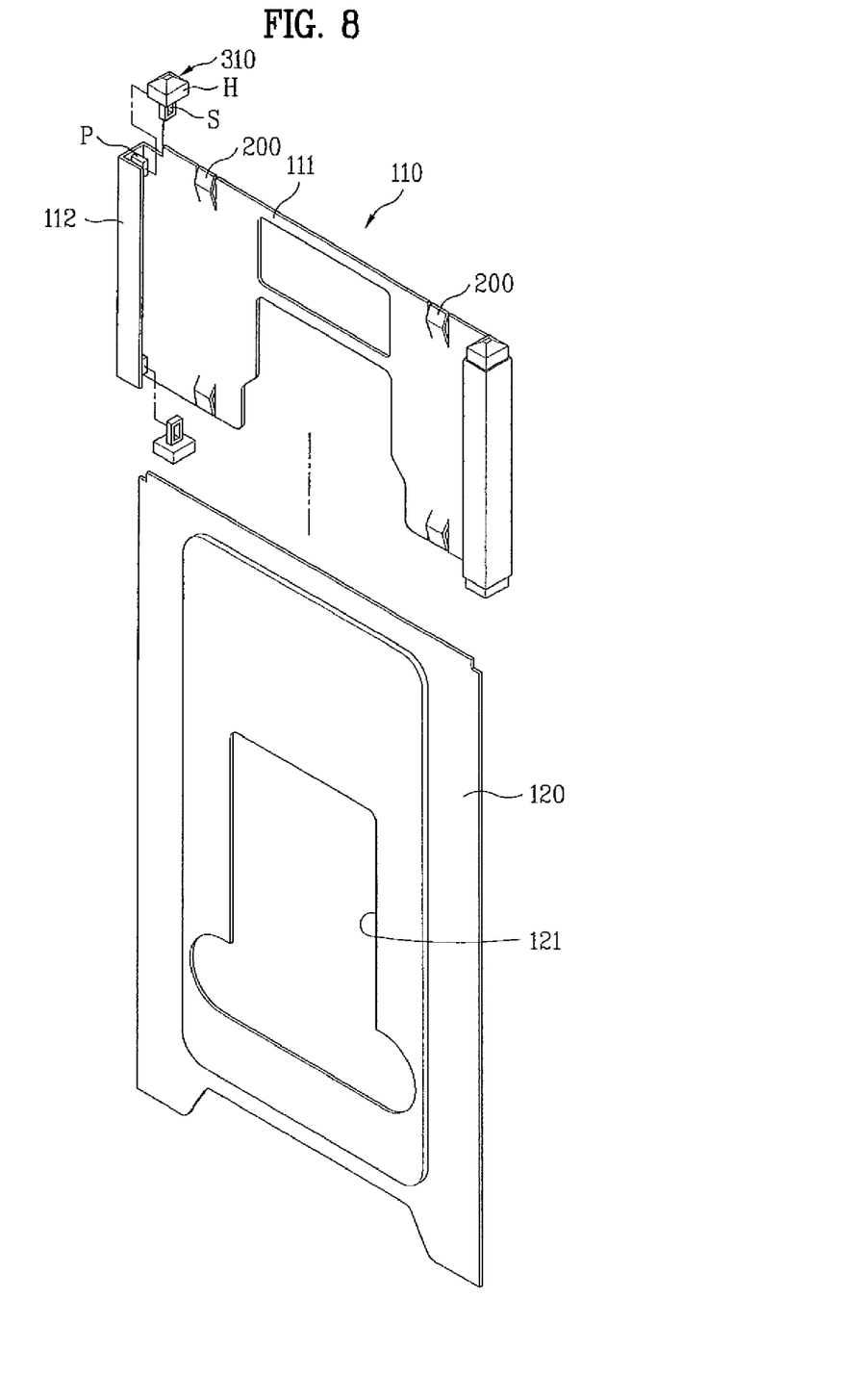
FIG. 8 is an exploded perspective view of the sliding apparatus of FIG. 4 and FIG. 5.
Figure 9:
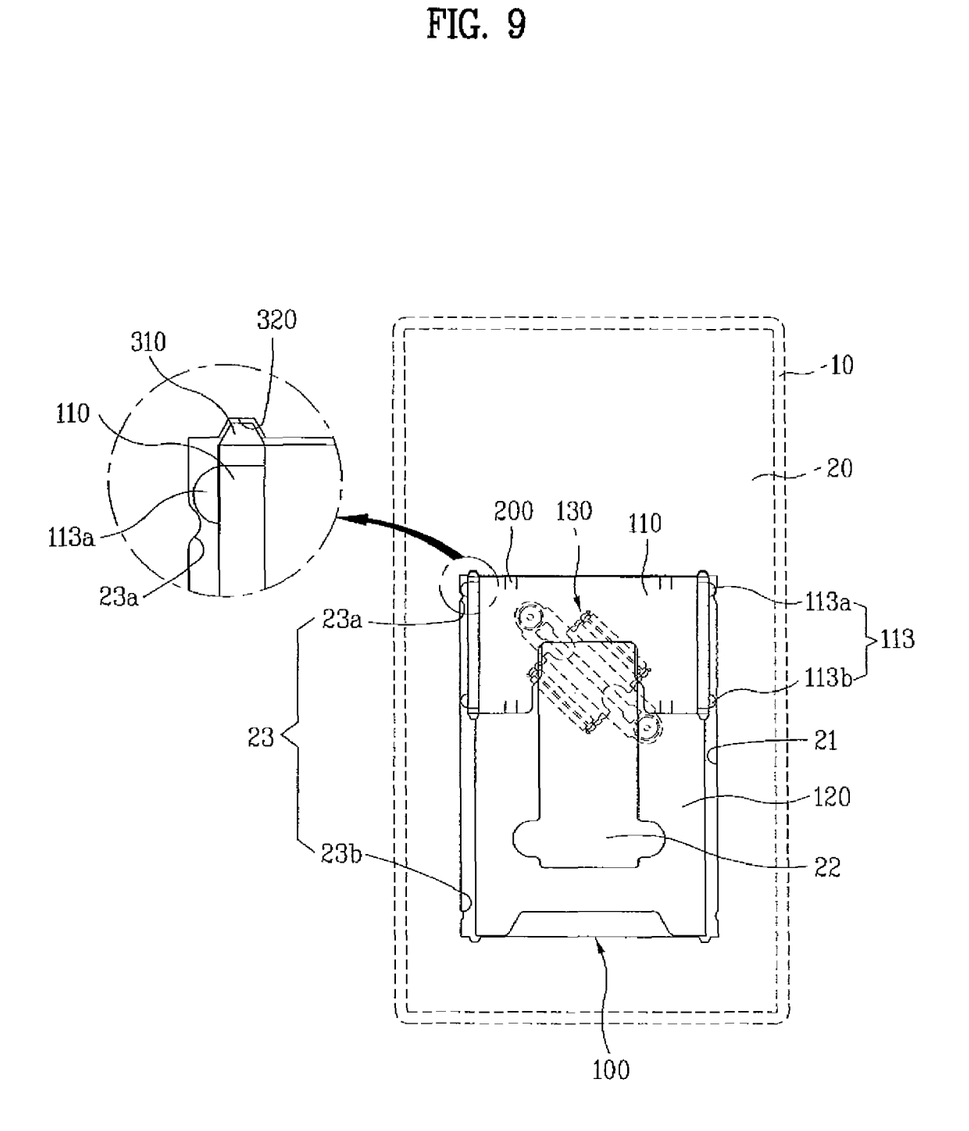

As shown in FIG. 8 and FIG. 9, a buffering part is provided at least one of upper and lower portions of the slider 110. Seating part corresponding to buffering part may be provided at least one of upper and lower portions of the installation recess 21 to allow the buffering part to be seated thereon or received therein. The buffering part may take the form of a buffering protrusion 310 while the seating part may take the form of a seating recess 320. If the slider 110 slides up along the plate 120, the buffering protrusion 310 provided at the upper portion of the slider 110 is seated on the seating recess 320 for buffering.

The buffering protrusion 310 includes a head H configured to be seated on the seating recess 320 and a locking hole S. The locking hole S is mountable to a locking projection P provided at an inner surface of a sliding part 112 of the slider 110 and then provided to an upper or lower portion of the sliding part 112.

Preferably, the head H of the buffering protrusion 310 is configured to have approximately a pyramid shape to buffer a shock by increasing a contacting area with the seating recess 320. More preferably, by forming the head H of a rubber based material, the buffering effect may be enhanced. If an inner surface of the seating recess 320 is formed of a rubber based material, the buffering effect can be further enhanced.

As a result, when the second body 20 slides up or down against the first body 10, the buffering protrusion 310 and the seating recess 320 can buffer or reduce the shock. And, it is also able to assist in preventing the free movement of the slider 110 in a slide-up or slide-down status.

Figure 10:
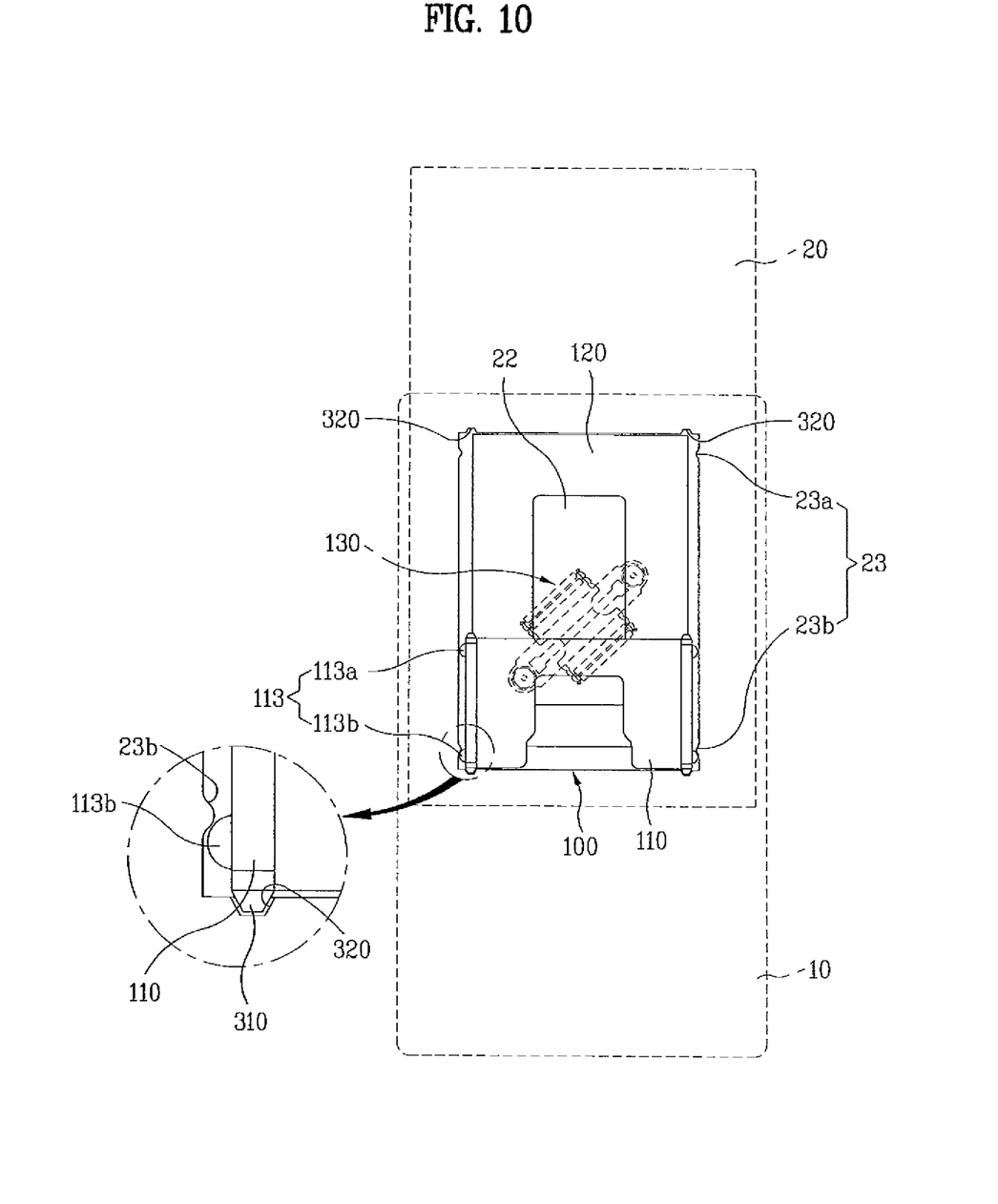

FIGS. 9 to 12 show a holding member and a projection as another example of a stabilizer of a mobile communication terminal according to the present invention. As shown in FIG. 9 and FIG. 10, a protruding holder 23 as an example of a holding member is provided at upper and lower portions of both sides of an installation recess 21. A protrusion 113 is provided at upper and lower portions of both sides of the slider 110 to correspond to the protruding holder 23.

In the situation where a sliding motion is carried out to open the mobile communication terminal, as shown in FIG. 10, from a closed position, as shown in FIG. 9, the upper projection 113a provided at the upper portion of the slider 110 is held by the upper protrusion 23a provided at the upper portion of the side of the installation recess 21 to generate a frictional force.

If an external force is further applied thereto, the upper projection 113a overpasses the upper protrusion 23a by overcoming the frictional force against the upper protrusion 23a to start a sliding movement. While the sliding movement is carried out, the lower projection 113b provided to the lower portion of the slider 110 is held by the lower protrusion 23b provided to the lower portion of the installation recess 21 to generate another frictional force again.

If an external force is further applied thereto, the lower projection 113b compresses to overpass the lower protrusion 23b and completes the slide-up operation by adhering closely to the lower protrusion 23b.

In the situation where a sliding motion is carried out to close the mobile communication terminal, as shown in FIG.

9, from an open position, as shown in FIG. 10, the motion is reverse of that described above. In particular, a sliding movement begins as the lower projection 113b overpasses the lower protrusion 23b by overcoming the frictional force, the upper projection 113a is held by the upper protrusion 23a to generate a frictional force, the upper projection 113a overpasses the upper protrusion 23a by overcoming the frictional force against the upper protrusion 23a, the upper projection 113a and the upper protrusion 23a then contacts each other. Thus, the slide-down operation is completed.

In this configuration of the mobile communication terminal, the slide-up operation corresponds to an action that the second body opens the first body. And, the slide-down operation corresponds to an action that the second body closes the first body.

Figure 11:
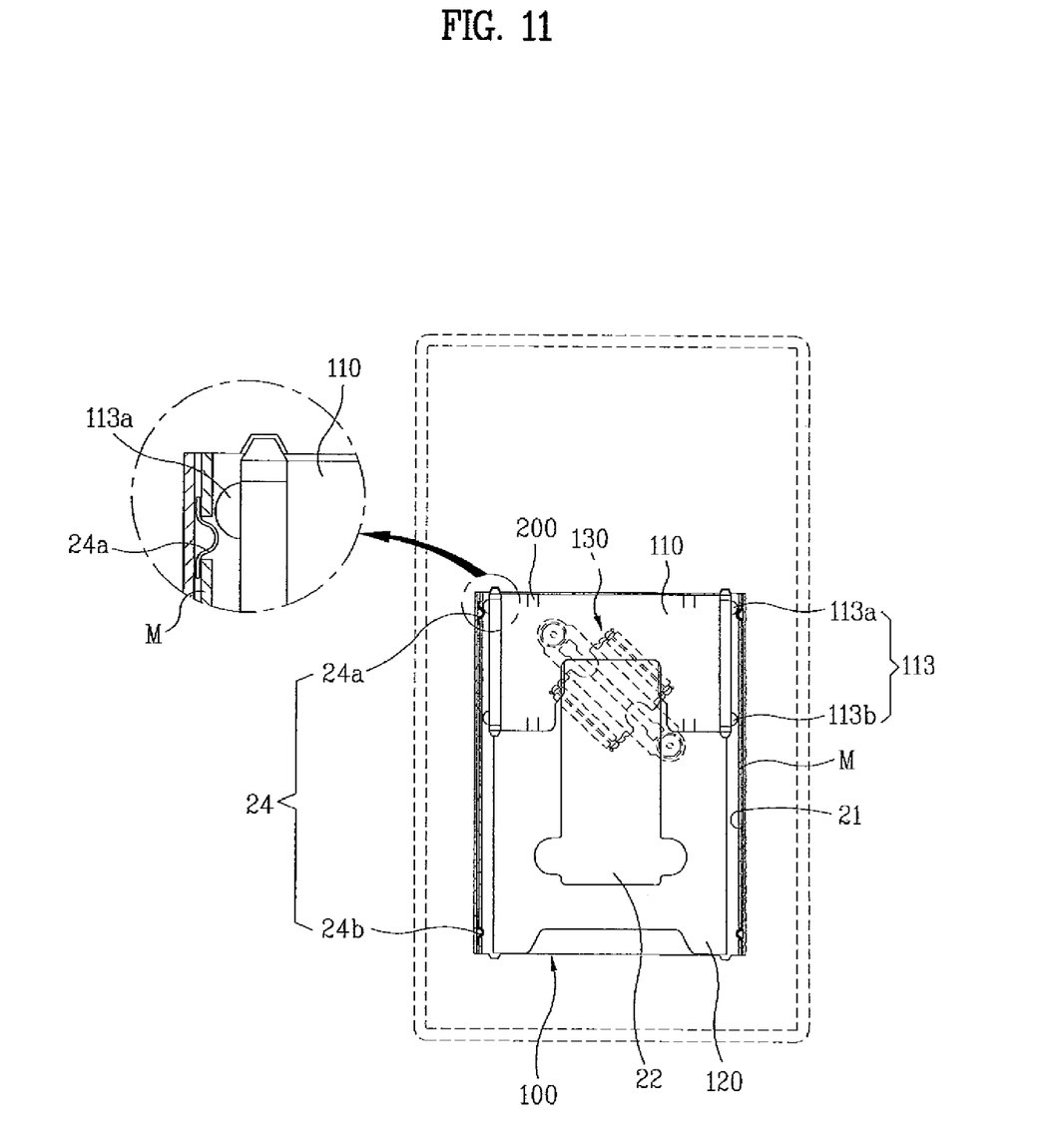
FIG. 11 and FIG. 12 are schematic views showing operational status of a sliding apparatus according to another exemplary embodiment of the present invention in association with a mobile communication terminal.
Figure 12:
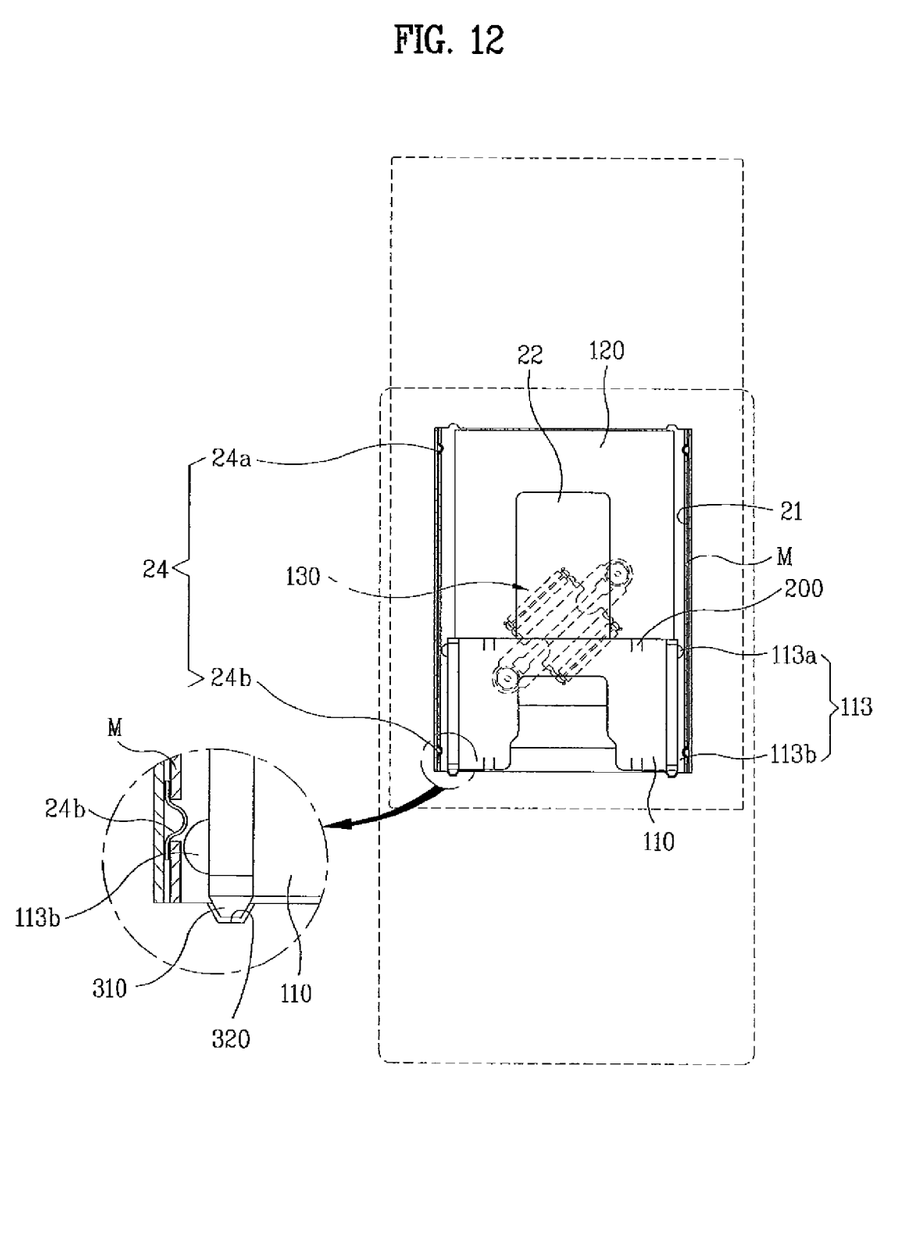

As shown in FIG. 11 and FIG. 12, another exemplary holding member and projection are provided. A spring holder 24 is provided as another example of a holding member at upper and lower portions of both sides of an installation recess 21 and a projection 113 is provided at upper and lower portions of both sides of a slider 110 to correspond to the spring holder 24.

The spring holder 24, which has an elastic force, is configured to have approximately a 'Ω' shape. Both ends of the spring holder 24 are placed between a lateral side of the installation recess 21 and a partition M to allow both ends of the spring holder 24 to move in a length direction of the mobile communication terminal.

During sliding movement of the slider 110, the projection 113 of the slider 110 compresses the spring holder 24 and then overpasses the spring holder 24 and remaining in contact with each other. Because the projection 113 is fixed thereto, an elastic restoring force of the spring holder 24 prevents the free movement of the slider 110.

The configuration of the partition M in FIG. 11 and FIG. 12 is intended as being exemplary. Alternatively, the partition M can be replaced by a structure enabling a free end portion of the spring holder 24 to secure a space for prescribed free movement. For instance, a recess may be provided at one side of the installation recess 21, the spring holder 24 may be installed in the recess, and both ends of the spring holder 24 are made to move freely to some extent. If so, then substantially same result of the above example can be obtained.

The slide-up operation and slide-down operation of this exemplary embodiment is similar to that described above with respect to FIG. 9 and FIG. 10, and therefore, details of operations of the mobile communication terminal according to the embodiment shown in FIG. 11 and FIG. 12 are omitted.

As mentioned in the foregoing description, the holding member and the projection can prevent the sliding apparatus 100 from moving freely in the installation recess 21 in case of the slide-up or slide-down of the terminal. Moreover, the elastic module 130 enables the automatic or semi-automatic sliding movement of the slider 110 to prevent collision between the slider 110 and the upper or lower portion of the installation recess 21.

A mobile communication terminal according to another embodiment of the present invention will explained with reference to FIG. 13 and FIG. 14 as follows. In this exemplary embodiment, the buffering part includes a buffering protrusion 340 and the seating part includes a seating recess 330.

Figure 13:
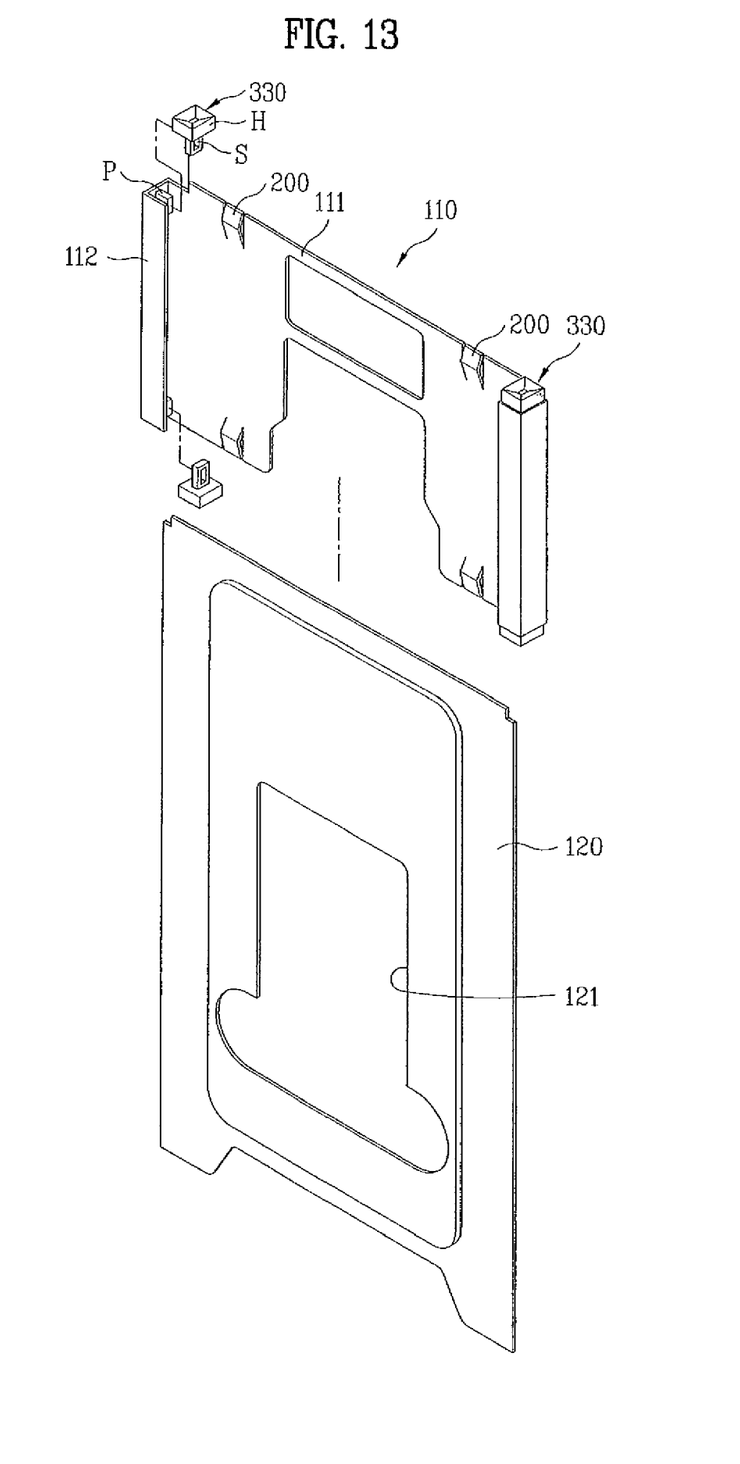
FIG. 13 is a perspective view of a sliding apparatus according to another exemplary embodiment of the present.

The seating recess 330, as shown in FIG. 13, is provided with a locking hole S to be locked to a locking protrusion P formed on an inside of a sliding part 112 of a slider 110. The seating recess 330 includes a head H. The head H, as shown in FIG. 13, is characterized in being recessed inward unlike the buffering protrusion 310 shown in FIG. 8.

Figure 14:
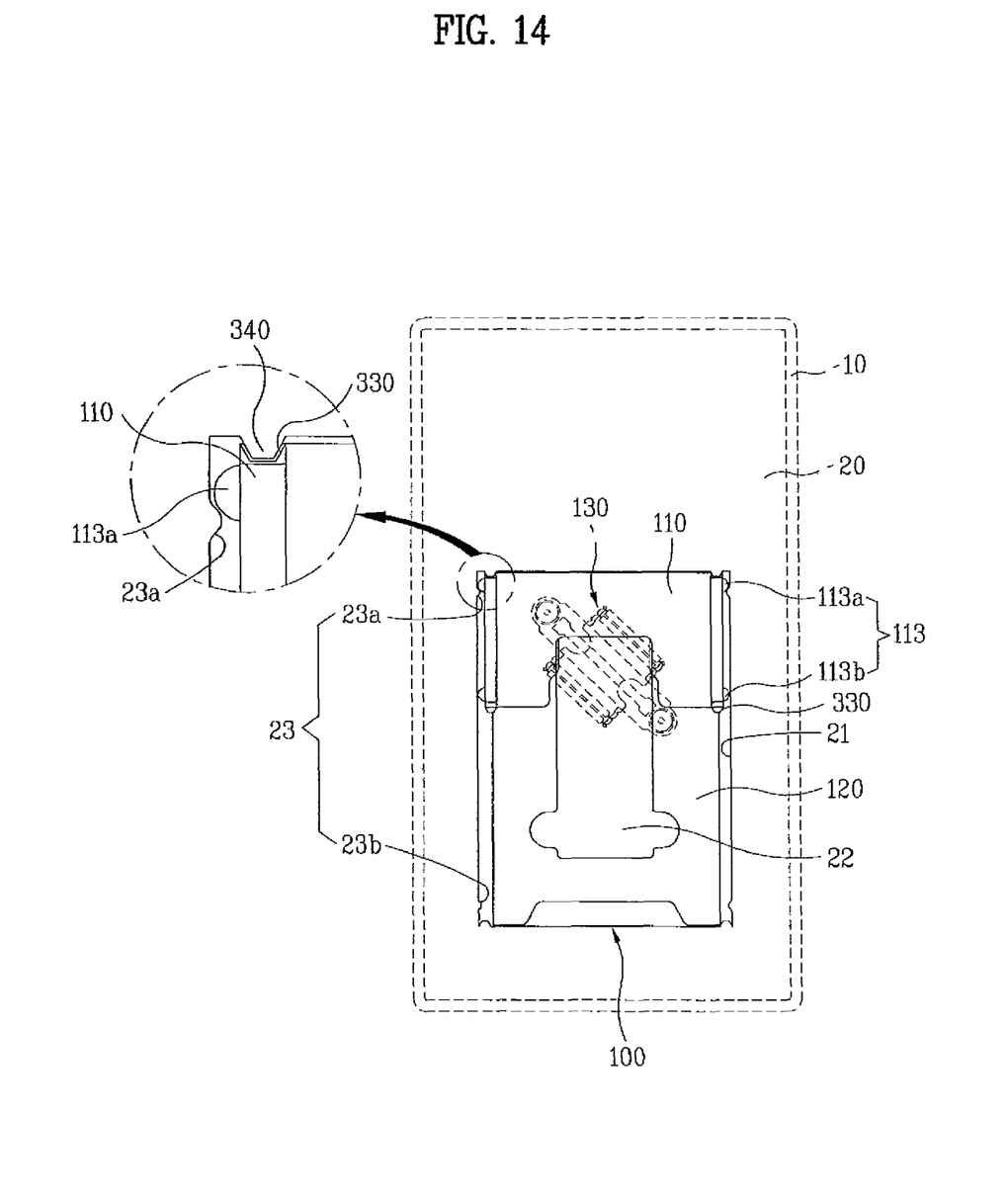
FIG. 14 is a schematic view showing an operational status of a mobile communication terminal provided with the sliding apparatus shown in FIG. 13.

The buffering protrusion 340, as shown in FIG. 14, is provided at upper and lower portions of the second body 20 and configured to correspond to the seating recess 330. In particular, when the second body 20 slides up or down, the buffering protrusion 340 is configured to protrude out to be inserted in a recessed portion of the seating recess 330. While the buffering protrusion has been shown as being provided at the second body, it is understood that the buffering protrusion may be provided at the first body.

The head H of the buffering protrusion 340 is preferably configured to have an approximately pyramid shape, thereby buffering a shock by increasing a contact area with the seating recess 330. In this particular configuration, the head H may be formed of a rubber based material to further enhance a shock buffering effect.

The seating recess 320 and the buffering protrusion 340 can buffer the shock generated when the second body 20 slides up or down on the first body 10. Moreover, the seating recess 330 and the buffering protrusion 340 can prevent the slider from moving freely in the slide-up or slide-down status.

Accordingly, the present invention provides the following effects or advantages. First, when a slider 110 slides along plate 120, a stabilizer prevents horizontal and vertical free movements and enables a smooth and natural sliding motion, thereby enabling a reliable sliding operation.

Second, the present invention assists in preventing free movement and buffering when a slide-up or slide-down action of a mobile communication terminal is performed, thereby providing a reliable sliding operation as well.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed:

1. A mobile communication terminal comprising:
   a first body;
   a second body slidably moveable between a first position and a second position;
   a plate located between the first body and the second body, the plate being connected to one of the first body and the second body;
   a slider supported by the plate to be slidably moveable thereon, the slider being connected to the other of the first body and the second body; and
   an elastic supporter provided on the slider,
   wherein the elastic supporter includes at least one elastic member having a supporting portion configured to extend from the slider and a free-end portion configured to extend from the supporting portion towards an outer surface of the plate, and
   wherein the free end portion presses against the plate to resist movement between the plate and the slider.

2. The terminal of claim 1, wherein the at least one elastic member is provided at at least one of an upper portion of the slider and a lower portion of the slider.

3. The terminal of claim 1, wherein the at least one elastic member includes:
   at least one upper elastic member provided at the upper portion of the slider, the at least one upper elastic member configured to have the free-end portion extend away from the upper portion of the slider; and
   at least one lower elastic member provided at the lower portion of the slider, the at least one lower elastic member configured to have the free-end portion extend away from the lower portion of the slider.

4. The terminal of claim 1, wherein elastic supporter includes at least one elastic protrusion provided at at least one of an upper portion of the plate and a lower portion of the plate.

5. The terminal of claim 4, wherein the at least one elastic protrusion includes:
   a supporting portion configured to extend from the plate; and
   a free-end portion pressed against the slider.

6. The terminal of claim 5, wherein the at least one elastic protrusion includes:
   at least one upper elastic protrusion provided at the upper portion of the plate, the at least one upper elastic protrusion configured to have the free-end portion extend towards an outer edge of the upper portion of the plate; and
   at least one lower elastic protrusion provided at the lower portion of the plate, the at least one lower elastic protrusion configured to have the free-end portion extend towards an outer edge of the lower portion of the plate.

7. The terminal of claim 1, wherein the elastic supporter includes:
   at least one elastic member provided at at least one of an upper portion of the slider and a lower portion of the slider; and
   at least one elastic protrusion provided at at least one of an upper portion of the plate and a lower portion of the plate.

8. The terminal of claim 1, further comprising a buffering part located on the slider and configured to engage one of the first body and second body when in at least one of the first position and the second position.

9. The terminal of claim 8, further comprising a seating portion located at one of the first body and the second body, the buffering part being receivable by the seating portion.

10. The terminal of claim 9, wherein the seating portion includes a seating recess and the buffering part includes a buffering protrusion configured to have a shape corresponding to the seating recess.

11. The terminal of claim 9, wherein the seating portion includes a seating protrusion configured to protrude and the buffering part includes a buffering recess configured to have a shape corresponding to the seating protrusion.

12. The terminal of claim 9, wherein the buffering part includes:
   a first buffering part located at an upper portion of the slider; and
   a second buffering part located at a lower portion of the slider; and
   the seating portion includes:
   a first seating portion located at an upper portion of one of the first body and the second body; and
   a second seating portion located at a lower portion of one of the first body and the second body,
   the first buffering part being received in the first seating part and the second buffering part being received in the second seating part.

13. The terminal of claim 8, further comprising:
   an installation recess at one of the first body and the second body to have the plate and the slider installed therein;
   a holding member protruding from at least one side of the installation recess; and
   a projection at at least one side of the slider to be held by the holding member when the slider is in at least one of the first and second positions.

14. The terminal of claim 13, the holding member including a protruding holder protruding from the at least one side of the installation recess.

15. The terminal of claim 14, the holding member including a spring holder at the at least one side of the installation recess to contact the projection of the slider.

16. The terminal of claim 1, further comprising a buffering part located on one of the first body and the second body, the buffering part engaging the slider when the slider is in one of the first position and the second position.

17. The terminal of claim 16, wherein the slider includes a seating portion, the buffering part being receivable by the seating portion.

18. The terminal of claim 17, wherein the seating portion includes a seating recess and the buffering part includes a buffering protrusion configured to have a shape corresponding to the seating recess.

19. The terminal of claim 17, wherein the seating portion includes a seating protrusion configured to protrude and the buffering part includes a buffering recess configured to have a shape corresponding to the seating protrusion.

* * * * *